(12) United States Patent
Eltes et al.

(10) Patent No.: US 11,009,727 B2
(45) Date of Patent: May 18, 2021

(54) INTEGRATED WAVEGUIDE STRUCTURE WITH POCKELS LAYER HAVING A SELECTED CRYSTAL ORIENTATION

(71) Applicant: International Business Machines Corporation, Armonk, NY (US)

(72) Inventors: Karl Felix Sebastian Eltes, Zurich (CH); Stefan Abel, Zürich (CH); Jean Fompeyrine, Waedenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/189,336

(22) Filed: Nov. 13, 2018

(65) Prior Publication Data

US 2020/0150467 A1  May 14, 2020

(51) Int. Cl.
    *G02F 1/035*    (2006.01)
    *G02F 1/295*    (2006.01)
    *G02B 6/10*     (2006.01)

(52) U.S. Cl.
    CPC .................................. *G02F 1/035* (2013.01)

(58) Field of Classification Search
    CPC ...................................................... G02F 1/035
    USPC ..................................... 385/2, 8–9, 129–132
    See application file for complete search history.

(56) References Cited

U.S. PATENT DOCUMENTS

| | | |
|---|---|---|
| 8,897,614 B2 | 11/2014 | Suzuki et al. |
| 9,291,838 B2 | 3/2016 | Takemura et al. |
| 9,417,469 B2 | 8/2016 | Abel et al. |
| 9,703,127 B2 | 7/2017 | Abel et al. |
| 9,897,825 B2 | 2/2018 | Katou et al. |
| 2012/0033284 A1* | 2/2012 | Fukuda ................. G02F 1/025 359/248 |

(Continued)

FOREIGN PATENT DOCUMENTS

WO        2018081340 A1    5/2018

OTHER PUBLICATIONS

Abel et al., "A Hybrid Barium Titanate—Silicon Photonics Platform for Ultraefficient Electro-Optic Tuning," Journal of Lightwave Technology 34.8, 2016, pp. 1688-1693.

(Continued)

*Primary Examiner* — Kaveh C Kianni
*Assistant Examiner* — Hung Q Lam
(74) *Attorney, Agent, or Firm* — Cantor Colburn LLP; Daniel Morris

(57) ABSTRACT

Aspects of the invention are directed to an electro-optical device having a layer structure including a substrate, an electrically insulating layer on top of the substrate, a bonding layer on top of the electrically insulating layer, a Pockels layer on top of the bonding layer, a waveguide core on top of the Pockels layer, and a cladding layer cladding both the waveguide core and the Pockels layer, the latter coated by the cladding layer. The Pockels layer is a layer of a crystalline first material having a Pockels coefficient between 10 pm/V and 10 000 pm/V. The waveguide core includes a second material, which can be crystalline. The device can be adapted to optically couple radiation into and/or from the waveguide core. Each of the first material and the second material has a larger refractive index than the electrically insulating layer and the cladding layer for said radiation.

18 Claims, 4 Drawing Sheets

FIG. 1

(56) References Cited

U.S. PATENT DOCUMENTS

| | | |
|---|---|---|
| 2016/0000557 A1 | 1/2016 | Galstian et al. |
| 2016/0109731 A1* | 4/2016 | Huang .................... G02F 1/015 385/3 |
| 2017/0285396 A1 | 10/2017 | Nimura |
| 2017/0307954 A1 | 10/2017 | Dagli |

OTHER PUBLICATIONS

Alexander et al., "Nanophotonic Pockels modulators on a silicon nitride platform," arXiv preprint arXiv:1805.05437, 2018, 11 pages.

Eltes et al., "A novel 25 Gbps electro-optic Pockels modulator integrated on an advanced Si photonic platform," 2017 IEEE International Electron Devices Meeting (IEDM), IEEE, 2017, 4 pages.

Eltes et al., "Low-Loss BaTiO3—Si Waveguides for Nonlinear Integrated Photonics," ACS Photonics 3.9, 2016, pp. 1698-1703.

George et al., "Lanthanide-Assisted Deposition of Strongly Electro-optic PZT Thin Films on Silicon: Toward Integrated Active Nanophotonic Devices," ACS Applied Materials & Interfaces 7.24, 2015, pp. 13350-13359.

Wang et al., "Nanophotonic lithium niobate electro-optic modulators," Optics Express 26.2, 2018, pp. 1547-1555.

\* cited by examiner

US 11,009,727 B2

INTEGRATED WAVEGUIDE STRUCTURE WITH POCKELS LAYER HAVING A SELECTED CRYSTAL ORIENTATION

BACKGROUND

The invention relates in general to the field of electro-optical devices with integrated waveguide structures, as well as related silicon photonic circuits and methods of fabrication thereof. In particular, it is directed to a device including a Pockels layer having a selected crystal orientation.

Silicon photonics involve many components, starting with basic devices, such as active optical interconnects, including modulators and switches.

For example, integrated electro-optic modulators for high-order modulation formats need integration of Pockels materials (i.e., materials exhibiting a substantial Pockels effect) with silicon. Thin films with large Pockels effect are required, which effects are mainly present in crystalline materials. Now, crystalline layers are needed, which have an aligned or predetermined or selected crystal orientation, in order to maximize (effectively) the Pockels effect. A buffer layer, an epitaxial substrate, or a seed layer is therefore needed to achieve a well-aligned crystal orientation.

However, such an interface layer can be detrimental to the device performance, in terms of optical properties. Accordingly, aspects of the invention provide integrated Pockels devices having a selected crystal orientation, and which are substantially free of detrimental interfacial layers for crystal alignment purposes.

SUMMARY

According to a first aspect, the present invention is embodied as an electro-optical device. The device has a layer structure comprising: a substrate; an electrically insulating layer (on top of the substrate); a bonding layer (on top of the electrically insulating layer); a Pockels layer (on top of the bonding layer); a waveguide core (on top of the Pockels layer); and a cladding layer cladding both the waveguide core and the Pockels layer, the latter being directly coated by the cladding layer. The Pockels layer is a layer of a first material, which is crystalline (typically having a perovskite structure), whose Pockels coefficient is between 10 pm/V and 10 000 pm/V. The waveguide core comprises a second material, which may possibly be crystalline too. Moreover, the device is adapted to optically couple radiation into and/or from the waveguide core, in operation. Each of the first material and the second material has a larger refractive index than the electrically insulating layer and the cladding layer for said radiation.

The present devices can be obtained thanks to novel fabrication methods as described herein. While in the known methods a crystal-alignment interface layer (a buffer layer, an epitaxial, or a seed layer) is required to grow the Pockels layer, the present fabrication methods make sure that no such interface layer remains at the interface between the top cladding layer and the Pockels layer. I.e., the cladding layer is here in direct contact with the Pockels layer, even at the immediate periphery edge of the waveguide core. The direct contact between the cladding and the Pockels layer markedly improves the optical properties of the resulting structure, as Inventors observed.

As inventors further observed, improved optical properties may be obtained if the first material has a Pockels coefficient that is between 100 and 2 000 pm/V, as in embodiments.

In some embodiments of the invention, the layer structure does not comprise any crystal-alignment interface layer between the waveguide core and the Pockels layer.

In embodiments of the invention, the layer structure comprises a residual interface layer between the waveguide core and the Pockels layer. However, the residual interface layer does not protrude laterally from the waveguide core, such that the cladding layer remains in direct contact with the Pockels layer at the periphery of the waveguide core.

As evoked above, the first material typically is a perovskite material. The first material may for example comprise one of: $Ba_xSr_{1-x}TiO_3$, $Pb[Zr_xTi_{1-x}]O_3$, $[Pb_yLa_{1-y}][Zr_xTi_{1-x}]O_3$, $KNbO_3$, $BiFeO_3$, and $KTaO_3$. In embodiments of the invention, the first material comprises $BaTiO_3$.

In embodiments, the second material is one of: Si, $Si_3N_4$, $SiO_xN_y$, $Ta_2O_5$; AlN; $AlO_x$; AlON; $HfO_x$; $TiO_x$; and $ZrO_x$.

In other embodiments, the second material is one of: $Ba_xSr_{1-x}TiO_3$, $Pb[Zr_xTi_{1-x}]O_3$, $[Pb_yLa_{1-y}][Zr_xTi_{1-x}]O_3$, $KNbO_3$, $BiFeO_3$, and $KTaO_3$. I.e., the second material may be a perovskite material as well. The first and second materials may for instance be the same.

In embodiments of the invention, one or each of the electrically insulating layer and the cladding layer comprises a material that is one of: $SiO_2$, $Si_3N_4$, $SiO_xN_y$, AlN, $AlO_x$, AlON, $HfO_x$, $Ta_2O_5$, $TiO_x$, and $ZrO_x$. In some embodiments of the invention, the electrically insulating layer comprises $SiO_2$.

In some embodiments of the invention, the bonding layer includes a material that is one of $SiO_2$ and $Al_2O_3$.

In preferred embodiments, the electrically insulating layer and the substrate respectively correspond to a buried oxide layer and a silicon substrate of a silicon-on-insulator substrate.

In some embodiments of the invention, the substrate, the electrically insulating layer, the bonding layer, the Pockels layer, the waveguide core and the cladding layer are successively stacked along a stacking direction z, and the waveguide core has an average thickness that is between 50 nm and 500 nm, wherein said thickness is measured along the stacking direction z.

In embodiments, the waveguide core has an average width that is between 10 nm and 1 000 nm, said width being measured perpendicularly to the stacking direction and in-plane with the waveguide core.

In some embodiments of the invention, the Pockels layer has an average thickness that is between 10 nm and 1 000 nm, as measured along the stacking direction z.

In preferred embodiments, the device is configured as one of a modulator, a switch, and an electric-field sensor.

According to another aspect, the invention is embodied as a silicon photonic circuit, comprising an electro-optical device according to the first aspect above, integrated therein.

In embodiments, the electro-optical device is co-integrated, in the silicon photonic circuit, with one or more integrated circuit components.

According to a final aspect, the invention is embodied as a method of fabrication of an electro-optical device according to the first aspect above. The method first comprises obtaining a first layer stack. This stack comprises: one or more first layers; an alignment interface layer on top of the one or more first layers; a Pockels layer on top of the interface layer; and a first bonding layer on top of the Pockels layer. Next, a second layer stack is obtained, which comprises: a substrate; an electrically insulating layer on top of the substrate; and a second bonding layer on top of the electrically insulating layer. The first layer stack is then bonded onto the second layer stack via the first bonding layer and the second bonding layer. The method further comprises, removing, at least partly, the one or more first layers and structuring a core material to form a waveguide core on one side of the Pockels layer, whereby the interface layer is at least partly removed and at most a residual portion of the interface layer remains between the Pockels layer and the waveguide core. Finally, both the structured waveguide core and the Pockels layer are cladded on said one side, to obtain a cladding layer that directly coats the Pockels layer. Consistently with other aspects of the invention, the Pockels layer is a layer of a first material, which is crystalline and has a Pockels coefficient between 10 pm/V and 10 000 pm/V and the waveguide core comprises a second material, which is in some embodiments of the invention crystalline too. The device is otherwise fabricated so as to be adapted to optically couple radiation into and/or from the waveguide core, in operation of the device, and each of the first material and the second material is chosen so as to have a larger refractive index than (each of) the electrically insulating layer and the cladding layer, for said radiation.

In some embodiments of the invention, the interface layer is completely removed prior to structuring the waveguide core from a core material deposited on said one side of the Pockels layer.

In some embodiments of the invention, the one or more first layers comprise two or more layers, including a layer of said core material layer and one or more additional layers of material. In this case, said one or more additional layers of material are removed prior to structuring the layer of said core material to obtain the structured waveguide core. Moreover, the interface layer is only partly removed upon structuring the waveguide core, such that only a residual portion of the interface layer remains between the Pockels layer and the waveguide core. This is furthermore carried out such that the residual portion of the interface layer does not protrude laterally from the waveguide core. Thus, the cladding layer is in direct contact with the Pockels layer at a periphery of the waveguide core.

In embodiments, the one or more first layers of the first layer stack comprise: a first substrate; a first electrically insulating layer on top of the first substrate; and an additional material layer on top of the first electrically insulating layer, whereby the interface layer is on top of the additional material layer. Moreover, in the second layer stack obtained: the substrate is a second substrate; and the electrically insulating layer is a second electrically insulating layer.

In some embodiments of the invention, one or each of the first layer stack and the second layer stack is obtained from a silicon-on-insulator substrate including a buried oxide layer.

In preferred embodiments, said electro-optical device is obtained as part of a silicon photonic circuit, wherein said electro-optical device is integrated in the silicon photonic circuit.

Devices, circuits, and methods of fabrication embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1:
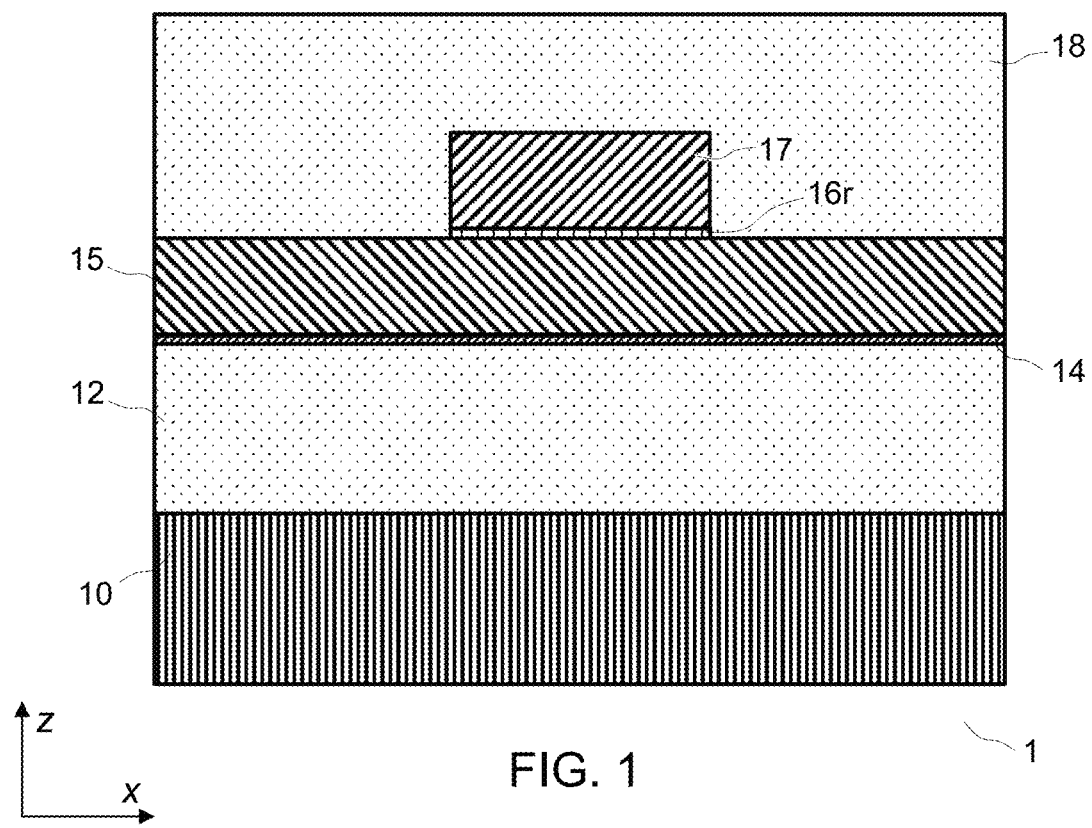
FIG. 1 is a 2D cross-sectional view of an electro-optical device, wherein the device includes a residual portion of an interface layer between a Pockels layer and a waveguide core, according to embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

Figure 2:
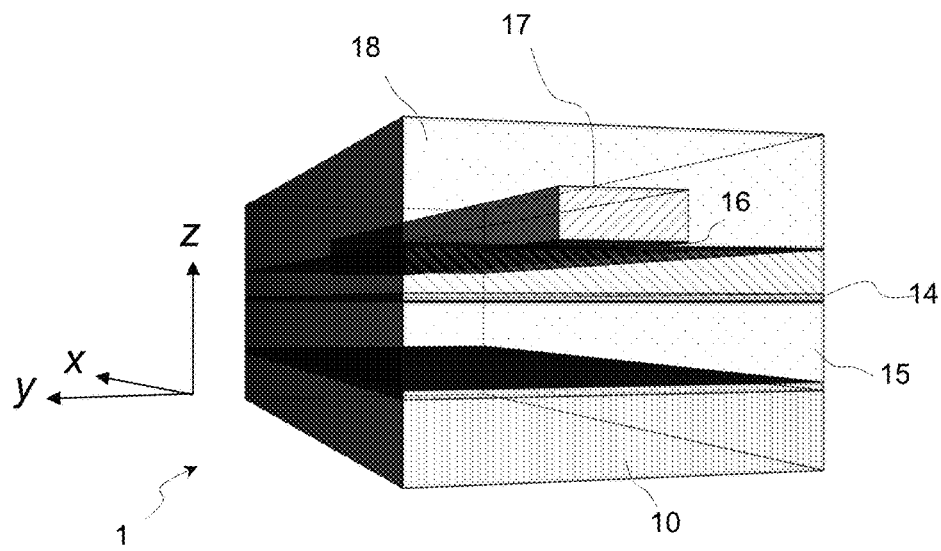
FIG. 2 is a 3D view of the device of FIG. 1.
Figure 3:
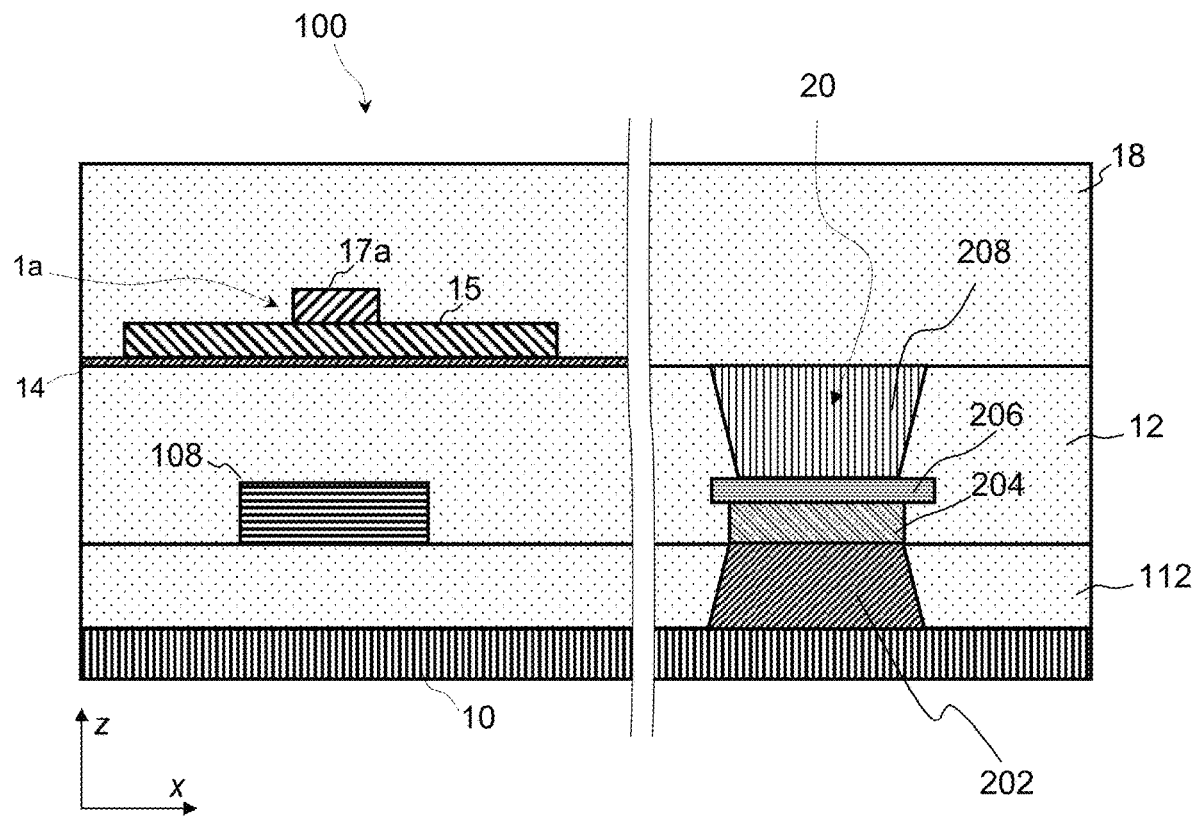
FIG. 3 is a 2D cross-sectional view of a silicon photonic circuit including a device such as shown in FIG. 1A, co-integrated with another component, according to embodiments.

In reference to FIGS. 1-3, an aspect of the invention is first described, which concerns an electro-optical device 1, 1a.

Figure 1A:
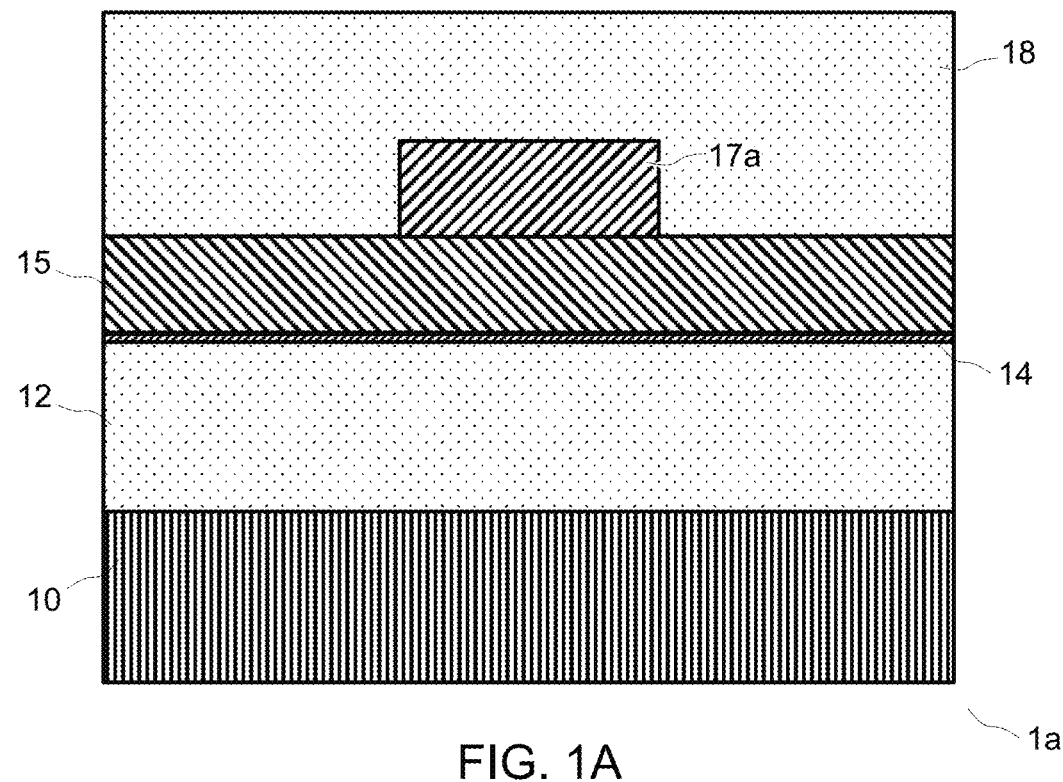
FIG. 1A shows a 2D cross-sectional view of a variant to the electro-optical device of FIG. 1, wherein the device is free of any interface layer between the Pockels layer and the waveguide core, according to other embodiments.

As best seen in FIGS. 1 and 1A, the device has a layer structure, which notably includes a substrate 10 and an electrically insulating layer 12, arranged on top of the substrate 10. Moreover, a bonding layer 14 is arranged on top of the electrically insulating layer 12. Another layer 15, hereafter referred to as a "Pockels layer" extends on top of the bonding layer 14. In addition, a waveguide core 17, 17a is structured on top of the Pockels layer 15. Finally, a cladding layer 18 clads both the waveguide core 17, 17a and the Pockels layer 15. Importantly, the Pockels layer 15 is directly coated by the cladding layer 18. I.e., there is no alignment interface layer (i.e., buffer, epitaxial or seed layer) between the Pockels layer 15 and the cladding 18.

Comments are in order. To start with, "on top" means "on one side of" and does not necessarily mean "in direct contact with", although it may be the case (at least between some of the layers), as assumed in FIGS. 1 and 1A. Moreover, if layer A is recited to be on top of layer B, which is itself recited to be on top of layer C, then layer A and B are, each, on a same side of layer C, irrespective of the actual orientation of the device in a gravitational field. In all cases, the layer structure described above imposes the cladding layer 18 to be in direct contact with the Pockels layer 15, even at the immediate periphery edge of the waveguide core 17, 17a. Finally, although the accompanying drawings show the waveguide 17, 17a structured as a strip waveguide, the skilled person may appreciate that the present waveguide cores may nevertheless be designed as rib waveguides, for example.

In terms of material properties, the Pockels layer 15 comprises a material (referred to as a "first material" herein), which has a crystal structure (typically a perovskite material). In preferred embodiments, the Pockels layer 15 comprises a high-quality crystalline material layer. E.g., the Pockels layer 15 shall ideally be a single crystal, although some mosaicity may typically be present. More generally, defects like mosaicity, dislocations, and curvature will create disruptions in the ideal parallelism of the atomic planes of that layer 15, which translates in a broadening of the rocking curve, when performing x-ray characterization of such a layer. Still, the full width at half maximum (FWHM) of the rocking curve will likely remain small, e.g., less than 5 degrees or, more preferably less than 1 degree. It remains, however, that the Pockels layer 15 must be essentially crystalline in the present case.

As known per se, a non-centrosymmetric crystal structure is required for the Pockels layer 15 to exhibit a Pockels effect. The Pockels effect refers to the linear electro-optic effect on the birefringence caused or produced in an optical medium as a result of an electric field, whereby the birefringence is proportional to the electric field applied. In the present case, the first material layer must have a Pockels coefficient that is between 10 pm/V and 10 000 pm/V. The material of the waveguide core 17, 17a, which is preferably crystalline too, is referred to as a "second material". Examples of suitable materials are given below.

The device 1, 1a is otherwise designed so as allow a radiation of interest to be optically coupled into and/or from the waveguide core 17, 17a, in operation. In addition, each of the first material (the Pockels layer 15) and the second material (waveguide core 17, 17a) has a larger refractive index than (each of) the electrically insulating layer 12 and the cladding layer 18, for said radiation, which may thus be confined in the layers 15, 17, 17a by total internal reflection. There is, however, no specific restriction between the refractive indices of the Pockels layer 15 and the waveguide core material 17, 17a.

The wavelength range of interest will normally be in the optical range (i.e., 100 nm-1 mm, according to DIN 5031). Thus, the terminology "radiation" as used herein typically refers to electromagnetic radiation in the wavelength range between 100 nm and 1 mm. However, the wavelength range will, in most applications, be between 200 nm and 7.5 μm. In particular, wavelengths of 1.3 and 1.55 μm are typically contemplated (and possibly 980 nm).

The present devices can be obtained thanks to novel fabrication methods as discussed below. While in known methods a buffer layer (or an epitaxial layer or seed layer) is normally required to grow the Pockels layer 15, the present fabrication methods make sure that no alignment interface layer remains at the interface between the top cladding layer 18 and the Pockels layer 15. I.e., the cladding layer 18 is here in direct contact with the Pockels layer 15, even at the periphery edge of the waveguide core 17, 17a, which markedly improves the optical properties of the resulting structure. On the contrary, prior art solutions either require single-crystalline substrates (which have limited size), inorganic materials (which are thermally unstable), or polycrystalline materials having low Pockels coefficients, thus resulting in a small electro-optic response.

Owing to the improved optical properties allowed by the present structures, the device 1, 1a may advantageously be configured as a modulator, a switch, and an electric-field sensor, for example.

Preferred embodiments are now described in reference to FIGS. 1-3. To start with, referring to FIG. 1, the electro-optical device 1 may possibly be fabricated in such a manner that its layer structure comprises a residual interface layer 16r between the waveguide core 17 and the Pockels layer 15. Still, this residual interface layer 16r does not protrude (laterally, in-plane) from the waveguide core 17. As a result, the cladding layer 18 remains in direct contact with the Pockels layer 15 at the periphery of the waveguide core 17, as seen in FIGS. 1 and 2. That is, the footprint of the residual interface layer 16r is confined, laterally, to that of the waveguide core, as best seen in FIG. 1. Corresponding methods of fabrication are later described in reference to FIG. 4.

In variants such as shown in FIG. 1A, the electro-optical device 1a may possibly be fabricated so that its layer structure does not comprise any interface layer (i.e., buffer layer, a seed layer, or an epitaxial layer) at all between the waveguide core 17a and the Pockels layer 15. Corresponding methods of fabrication are later described in reference to FIG. 5.

In terms of material compositions, the first material (Pockels layer 15) is preferably a perovskite material, e.g., it may notably comprise $Ba_xSr_{1-x}TiO_3$, $Pb[Zr_xTi_{1-x}]O_3$, $[Pb_yLa_{1-y}][Zr_xTi_{1-x}]O_3$, $KNbO_3$, $BiFeO_3$, or $KTaO_3$. The first material may in fact be a combination of materials, such as listed above. In some embodiments of the invention though, the first material comprises or even consists of a crystal of $BaTiO_3$, which has high Pockels coefficient (even as a thin film). Beside its composition, the first material shall preferably be selected so as to have a Pockels coefficient that is between 100 and 2 000 pm/V, which, as inventors observed, results in improved optical properties of the device. Note, such values refer to coefficients as measured for thin films, and not to bulk values.

In embodiments, the second material (waveguide core 17, 17a) comprises Si, $Si_3N_4$, $SiO_xN_y$ (it may notably be SiN), $Ta_2O_5$, AlN, $AlO_x$, AlON, $HfO_x$, $TiO_x$, or $ZrO_x$. The second material too may result from a combination of materials. In variants, any of the materials as contemplated for the Pockels layer 15 may possibly be used as a waveguide core material too. That is, the second material is preferably a perovskite material, which may possibly comprise $Ba_xSr_{1-x}TiO_3$, $Pb[Zr_xTi_{1-x}]O_3$, $[Pb_yLa_{1-y}][Zr_xTi_{1-x}]O_3$, $KNbO_3$, $BiFeO_3$, or $KTaO_3$. In particular, the first and second materials may be the same.

Besides, one or each of the electrically insulating layer 12 and the cladding layer 18 may possibly comprise a material that is one of $SiO_2$, $Si_3N_4$, $SiO_xN_y$, AlN, $AlO_x$, AlON, $HfO_x$, $Ta_2O_5$, $TiO_x$, and $ZrO_x$. In some embodiments of the invention though, this material comprises $SiO_2$, $Si_3N_4$, or $SiO_xN_y$ (e.g., SiN). More preferably, it comprises $SiO_2$, as obtained from a silicon-on-insulator (SOI) substrate. That is, the electrically insulating layer 12 and the substrate 10 may respectively correspond to a buried oxide layer 12 and a silicon substrate 10 of a SOI substrate 11.

In variants, the electrically insulating layer 12 may for example comprise Si3N4, which, as a passivation layer, is superior to silicon dioxide. Yet, SiO2 is used in some embodiments of the invention because it is a standard material in CMOS processes and can easily be obtained as part of a SOI substrate. Thus, particularly preferred structures for the electro-optical device 1, 1a make use of BaTiO3 for the first material and SiO2 for the electrically insulating layer 12.

In all cases, the materials selected for the electrically insulating layer 12 and the cladding layer 18 must be such that the refractive indices of the Pockels layer 15 and the waveguide core material are, each, larger than the refractive indices of (each of) the electrically insulating layer 12 and the cladding layer, for the radiation of interest.

For completeness, the bonding layer 14 may comprise $SiO_2$ or Al2O3, for example.

As seen in FIGS. 1-3, the substrate 10, the electrically insulating layer 12, the bonding layer 14, the Pockels layer 15, the waveguide core 17, 17a and the cladding layer 18 are successively stacked along the stacking direction z. In terms of dimensions, the waveguide core 17, 17a preferably has an average thickness that is between 50 nm and 500 nm. This thickness is measured along the stacking direction z. Meanwhile, the waveguide core 17, 17a preferably has an average width that is between 10 nm and 1 000 nm. The width of the waveguide core being is measured perpendicularly to the stacking direction and in-plane with the waveguide core 17, 17a, i.e., in the plane (x, y).

Next, the Pockels layer 15 preferably has an average thickness that is between 10 nm and 1 000 nm (as measured along the stacking direction z). The width of the Pockels layer 15 (as measured in a plane perpendicular to said stacking direction) will typically be on the order of 100 to 20 000 nm.

Next, according to another aspect, the invention can be embodied as a silicon photonic circuit 100. As depicted in FIG. 3, the circuit 100 integrates an electro-optical device 1a such as described above. Moreover, the electro-optical device 1a may possibly be co-integrated with one or more integrated circuit components 202-208, in the silicon photonic circuit 100.

An example of silicon photonic circuit 100 is depicted in FIG. 3, which includes the device 1a, as well as a passive Si waveguide 108. The Si waveguide 108 may actually form part of a layer structure of the Si photonic circuit, which may additionally contain one or more active devices 20. The device 1a can for instance be configured as a modulator in the circuit 100. In the example of FIG. 3, the device 1a is laterally embedded in a cladding medium 18, whereas other components 202-208 are laterally embedded in the cladding media 12, 112. Note, such cladding media may possibly include heat spreaders (not shown) for thermal management.

In the example of FIG. 3, the components 202-208 form part of an integrated circuit (IC) 20, co-integrated with the device 1a. The IC 20 comprises a heterostructure bipolar transistor, or HBT. The HBT may be supported on the same Si substrate 10 as used for the device 1a. More generally though, the HBT 20 may be co-integrated as a mere CMOS IC or a Bipolar IC.

The HBT 20 comprises a selective Si epitaxy layer 202 and, in addition, a Si collector 204, a silicon-germanium base 206 (SixGe1-x, with 0≤x≤1) and a Si emitter 208. Not all components of the HBT 20 are depicted, for conciseness. Similarly, not all components of the circuit 100 are depicted (for example, electrical contacts are not shown).

In all cases, with the Si waveguide 108 underneath the device 1a, the layer structure may be configured to optically couple radiation between the device and the Si waveguide 108. This optical coupling may be bidirectional or reciprocal, i.e., occur from the device 1a to the Si waveguide 108 and, conversely, from the Si waveguide 108 to the device 1a, in operation of the device 1a. The optical coupling is ideally adiabatic. I.e., the Si waveguide 108 is preferably configured so as to enable adiabatic coupling with the device 1a, e.g., it may include tapers (not shown) in the Si waveguide 108.

Next, according to a final aspect, the invention can be embodied as a method of fabrication of an electro-optical device 1, 1a such as described above. Two classes of fabrication methods are notably contemplated, which are now described in reference to FIGS. 4 and 5.

Figure 4A:
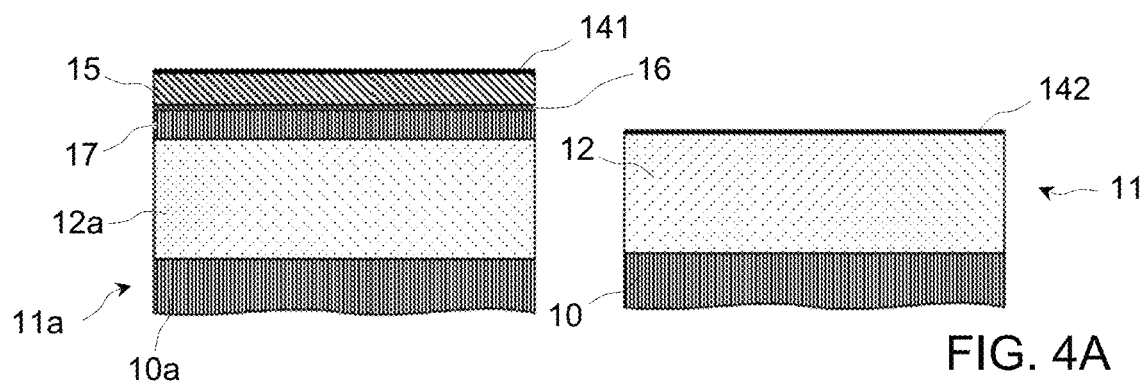
FIG. 4A is one of a sequence of 2D cross-sectional views illustrating high-level fabrication steps of a device such as shown in FIG. 1, according to embodiments.

Common aspects of these two classes of fabrication methods are first described. To start with, a first layer stack 11a is needed, as depicted in FIG. 4A. This layer stack 11a comprises one or more first layers 10a, 12a, 17i, as well as an interface layer 16, which is arranged on top of the first layers 10a, 12a, 17i. In addition, a Pockels layer 15 extends on top of the interface layer 16. A first bonding layer 141 is arranged on top of the Pockels layer 15.

As further seen in FIG. 4A, a second layer stack 11 is needed, which includes a substrate 10, an electrically insulating layer 12 (on top of the substrate 10), and a second bonding layer 142 (arranged on top of the electrically insulating layer 12).

The layer stacks 11, 11a are pre-requisites for both classes of fabrication methods described herein. Such layer stacks 11, 11a can for instance be fabricated thanks to standard lithographic techniques. In particular, each of the first layer stack and the second layer stack may be epitaxially grown from a substrate 10, 10a or, preferably, from a SOI substrate.

Figure 4B:
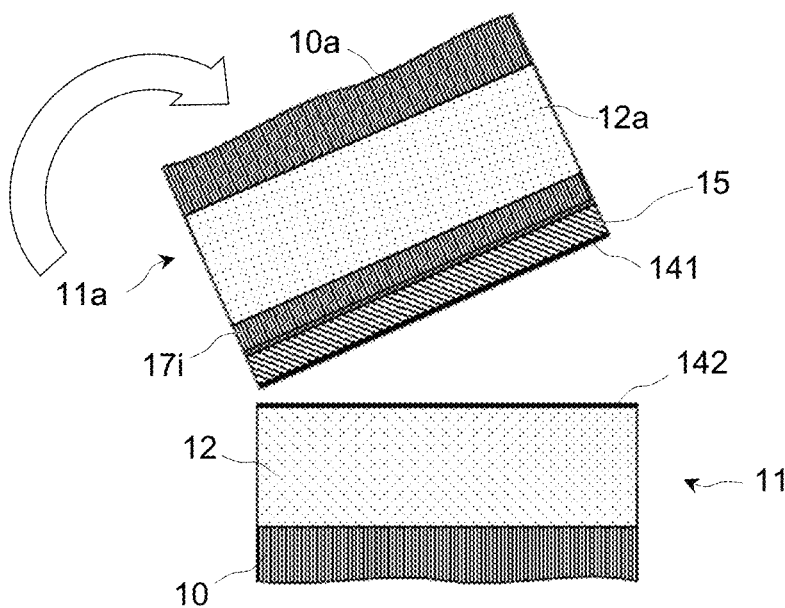
FIG. 4B is one of a sequence of 2D cross-sectional views illustrating high-level fabrication steps of a device such as shown in FIG. 1, according to embodiments.
Figure 4C:
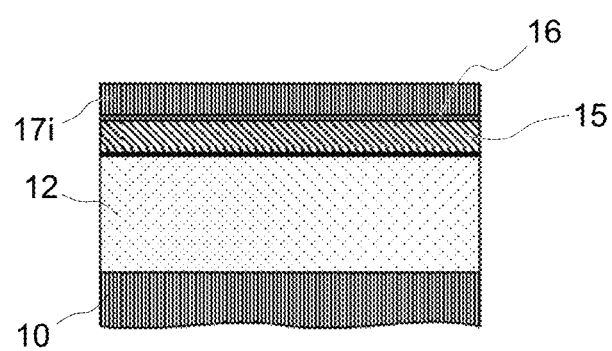
FIG. 4C is one of a sequence of 2D cross-sectional views illustrating high-level fabrication steps of a device such as shown in FIG. 1, according to embodiments.
Figure 5A:
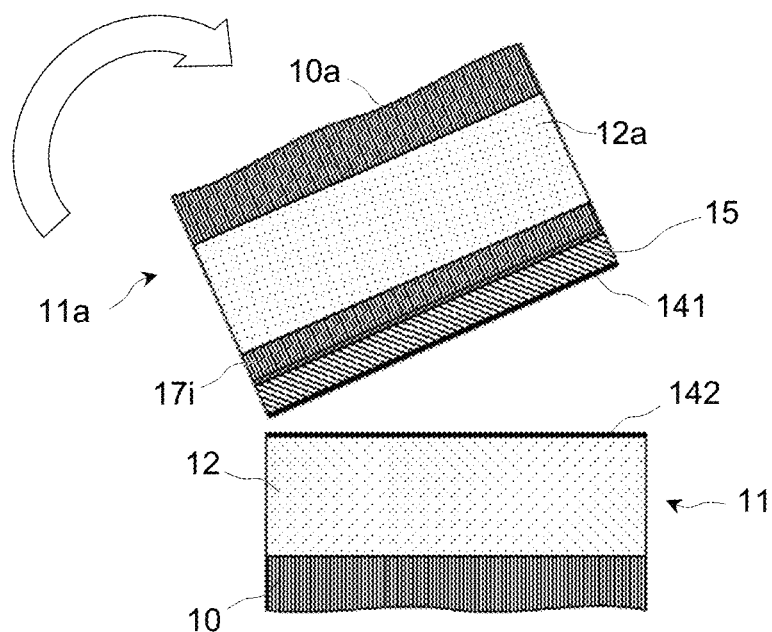
FIG. 5A is one of a sequence of 2D cross-sectional views illustrating high-level fabrication steps of a device such as shown in FIG. 1A, according to other embodiments.
Figure 5B:
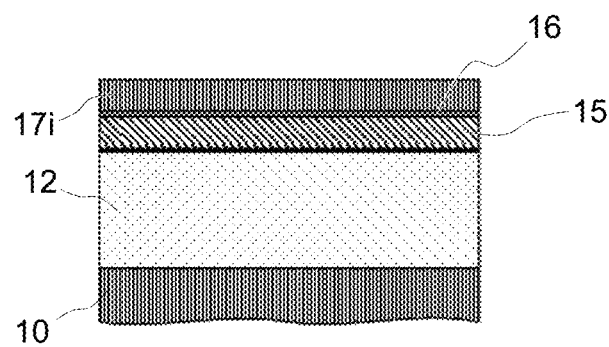
FIG. 5B is one of a sequence of 2D cross-sectional views illustrating high-level fabrication steps of a device such as shown in FIG. 1A, according to other embodiments.
Figure 5C:
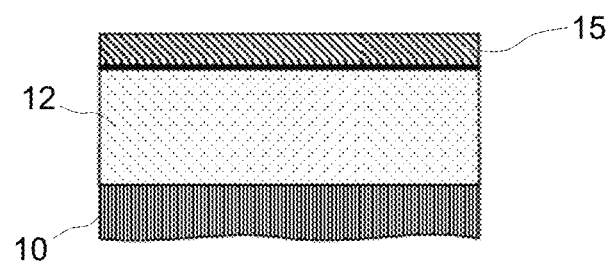
FIG. 5C is one of a sequence of 2D cross-sectional views illustrating high-level fabrication steps of a device such as shown in FIG. 1A, according to other embodiments.

Next, the first layer stack 11a is bonded onto the second layer stack 11 via the first bonding layer 141 and the second bonding layer 142, as depicted in FIGS. 4B and 5A. The layers 141, 142 eventually form a common bonding layer 14, as seen in FIGS. 1 and 1A.

Then, the one or more first layers 10a, 12a, 17i are at least partly removed (see FIGS. 4C, 5B, and 5C) and a core material is structured (see FIGS. 4D, and 5D), so as to form a waveguide core 17, 17a on one side of the Pockels layer 15 (the top side in the appended drawings). As a result, the interface layer 16 is at least partly removed, such that at most a residual portion 16r of the interface layer remains between the Pockels layer 15 and the waveguide core 17, 17a. That is, a residual portion 16r of the interface layer may possibly remain, as in FIG. 4D, or the interface layer 16 may be completely removed, see FIGS. 5B to 5D.

Figure 4D:
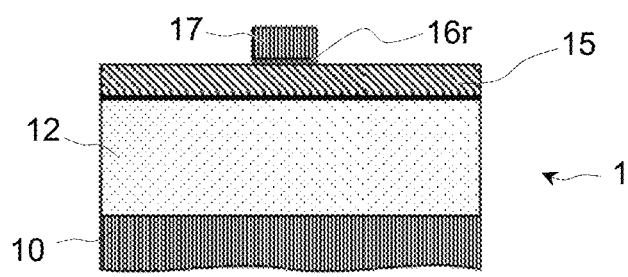
FIG. 4D is one of a sequence of 2D cross-sectional views illustrating high-level fabrication steps of a device such as shown in FIG. 1, according to embodiments.
Figure 5D:
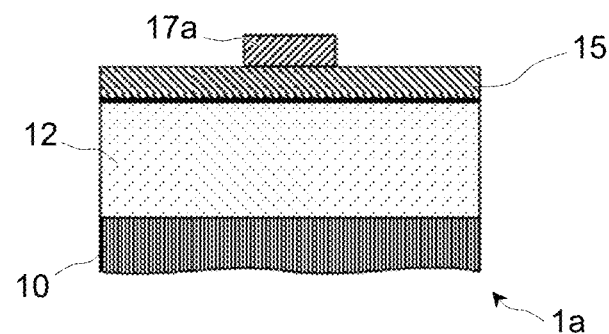
FIG. 5D is one of a sequence of 2D cross-sectional views illustrating high-level fabrication steps of a device such as shown in FIG. 1A, according to other embodiments.

For completeness, the layer structures as obtained in FIG. 4D or 5D are cladded with a layer 18 cladding both the structured waveguide core 17, 17a and the Pockels layer 15 on said one side. Because the interface layer 16 was at least partly removed, the cladding layer 18 directly coats the Pockels layer 15, as seen in FIGS. 1A and 1B.

As discussed earlier, the Pockels layer 15 comprises a first material having a crystal structure. The waveguide core is made of a second material, which may be crystalline too. The second material may possibly be identical to the first material. The latter has a Pockels coefficient between 10 pm/V and 10 000 pm/V or, preferably, between 100 and 2 000 pm/V. Each of the first and second materials has a larger refractive index than the electrically insulating layer 12 and the cladding layer 18, for a radiation of interest. The resulting device 1, 1a is otherwise adapted to optically couple such a radiation into and/or from the waveguide core 17, 17a, in operation.

The main differences between the two classes of methods are now discussed in detail. In the second class of methods (FIGS. 5A-5D), the interface layer 16 is completely removed (together with layer 17i, see FIG. 5C). This results in exposing the Pockels layer 15. Next, a waveguide core 17a is structured from a core material deposited as a new layer on the exposed side of the Pockels layer 15, see FIG. 5D.

On the contrary, in the first class of fabrication methods, the layer 17i of the stack 11a is reused (see FIG. 4A). That is, the layers 10a, 12a, 17i notably include a layer 17i (of core material) and one or more additional layers 10a, 12a of material. Said one or more additional layers 10a, 12a of material are removed prior to structuring the layer 17i (see FIG. 4D), to obtain the structured waveguide core 17. The interface layer 16 is only partly removed upon structuring the waveguide core 17, such that only a residual portion 16r of the interface layer 16 eventually remains between the Pockels layer 15 and the waveguide core 17. However, the residual portion 16r of the interface layer does not protrude (laterally) from the waveguide core 17. Thus, the cladding layer 18 is in direct contact with the Pockels layer 15 at the periphery of the waveguide core 17 (see FIG. 1).

As seen in FIG. 4A, the layers 10a, 12a, 17i of the first layer stack 11a may notably comprise a substrate 10a, an electrically insulating layer 12a (on top of the first substrate 10a), and an additional layer 17 on top of the first electrically insulating layer 12. I.e., the interface layer 16 is on top of layer 17. The bonding layer 141 extends on top of the Pockels layer 15. Similarly, the second layer stack 11 may comprise a substrate 10, supporting the an electrically insulating layer 12, with the bonding layer 142 extending on top of layer 12. One or (preferably) each layer stack 11, 11a may for instance be obtained from a SOI substrate. The electrically insulating layer 12, 12a may notably be formed from a buried oxide layer of the SOI substrate.

In embodiments, the electro-optical device 1, 1a is obtained as part of a silicon photonic circuit 100, with the device 1, 1a integrated in the circuit 100, as discussed earlier.

The terms "about," "substantially," "approximately," "slightly less than," and variations thereof, are intended to include the degree of error associated with measurement of the particular quantity based upon the equipment available at the time of filing the application. For example, "about" can include a range of ±8% or 5%, or 2% of a given value.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. An electro-optical device with a layer structure, the device comprising:
   a substrate;
   an electrically insulating layer on top of the substrate;
   a bonding layer on top of the electrically insulating layer;
   a Pockels layer on top of the bonding layer;
   a waveguide core including a base, an upper surface, and opposing sidewalls extending from the base to the upper surface, the base on top of the Pockels layer; and
   a cladding layer cladding both the waveguide core and the Pockels layer, the latter being directly coated by the cladding layer, and the waveguide core embedded in the cladding layer such that the cladding layer directly contacts the opposing sidewalls and the upper surface,
   wherein:
   the Pockels layer comprises a layer of a first material, which is crystalline and has a Pockels coefficient between 10 pm/V and 10 000 pm/V;
   the waveguide core comprises a second material;
   the device is adapted to optically couple radiation into and/or from the waveguide core, in operation of the device; and
   each of the first material and the second material has a larger refractive index than the electrically insulating layer and the cladding layer for said radiation.

2. The electro-optical device according to claim 1, wherein:
   the first material has a Pockels coefficient that is between about 100 and about 2000 pm/V.

3. The electro-optical device according to claim 1, wherein the layer structure does not comprise any interface layer between the waveguide core and the Pockels layer.

4. The electro-optical device according to claim 1, wherein:
   the layer structure comprises a residual interface layer between the waveguide core and the Pockels layer; and
   the residual interface layer does not protrude laterally from the waveguide core, such that the cladding layer is in direct contact with the Pockels layer at a periphery of the waveguide core.

5. The electro-optical device according to claim 1, wherein the first material is selected from a group consisting of BaxSr1-xTiO3, Pb[ZrxTi1-x]O3, [PbyLa1-y][ZrxTi1-x]O3, KNbO3, BiFeO3, and KTaO3.

6. The electro-optical device according to claim 1, wherein the second material is selected from a group consisting of Si, Si3N4, SiOxNy, Ta2O5, AlN, AlOx, AlON, HfOx, TiOx, and ZrOx.

7. The electro-optical device according to claim 1, wherein the second material is selected from a group consisting of BaxSr1-xTiO3, Pb[ZrxTi1-x]O3, [PbyLa1-y][ZrxTi1-x]O3, KNbO3, BiFeO3, and KTaO3.

8. The electro-optical device according to claim 1, wherein one or each of the electrically insulating layer and the cladding layer comprises a material that is selected from a group consisting of $SiO_2$, Si3N4, SiOxNy, AlN, AlOx, AlON, HfOx, Ta2O5, TiOx, and ZrOx.

9. The electro-optical device according to claim 1, wherein the bonding layer comprises a material that is selected from the group consisting of SiO2 and Al2O3.

10. The electro-optical device according to claim 5, wherein the first material comprises BaTiO3.

11. The electro-optical device according to claim 10, wherein the electrically insulating layer comprises SiO2.

12. The electro-optical device according to claim 11, wherein the electrically insulating layer and the substrate respectively correspond to a buried oxide layer and a silicon substrate of a silicon-on-insulator substrate.

13. The electro-optical device according to claim 1, wherein:
 the substrate, the electrically insulating layer, the bonding layer, the Pockels layer, the waveguide core and the cladding layer are successively stacked along a stacking direction z; and
 the waveguide core has an average thickness that is between about 50 nm and about 500 nm, said thickness measured along a stacking direction z.

14. The electro-optical device according to claim 13, wherein the waveguide core has an average width that is between about 10 nm and about 1000 nm, said width being measured perpendicularly to the stacking direction and in-plane with the waveguide core.

15. The electro-optical device according to claim 13, wherein the Pockels layer has an average thickness that is between about 10 nm and about 1000 nm, as measured along a stacking direction z.

16. The electro-optical device according to claim 1, wherein the device is configured as one of a modulator, a switch, and an electric-field sensor.

17. A silicon photonic circuit, comprising the electro-optical device according to claim 1 integrated therein.

18. The silicon photonic circuit of claim 17, wherein the electro-optical device is co-integrated, in the silicon photonic circuit, with one or more integrated circuit components.

* * * * *